Patented Jan. 11, 1944

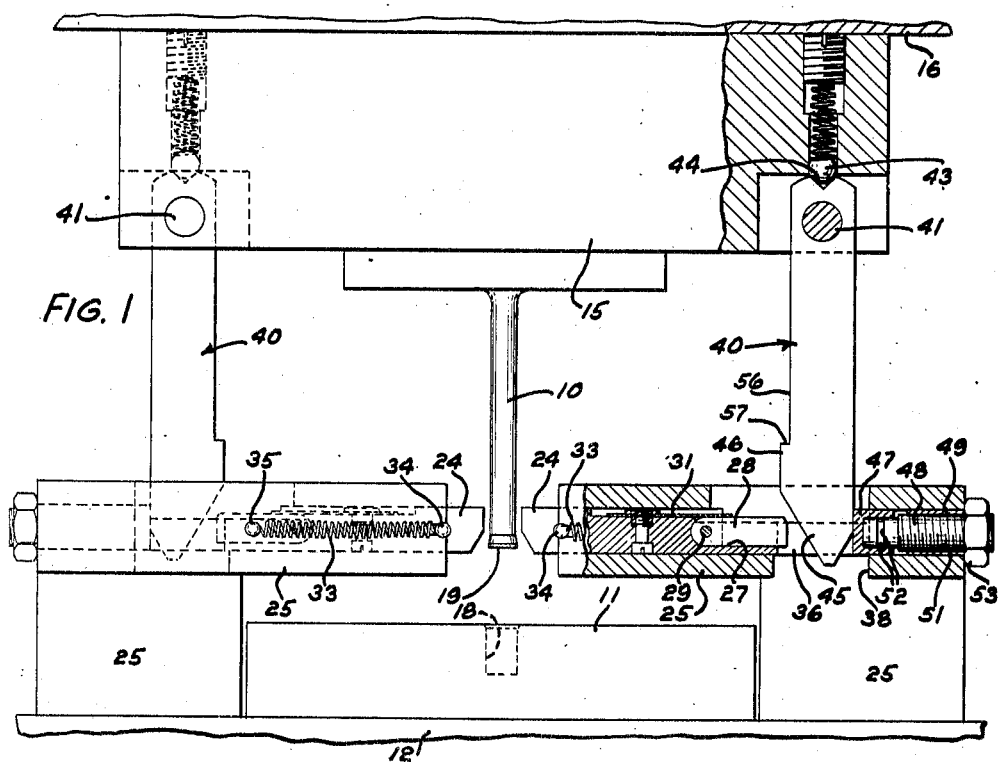
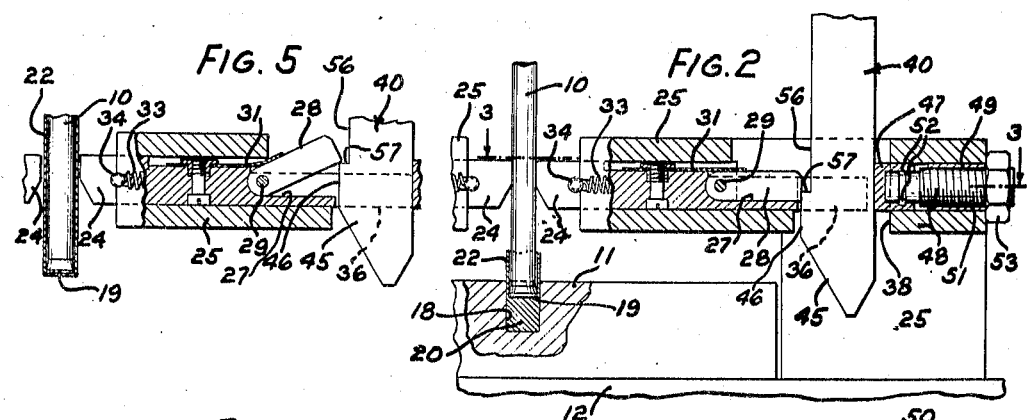
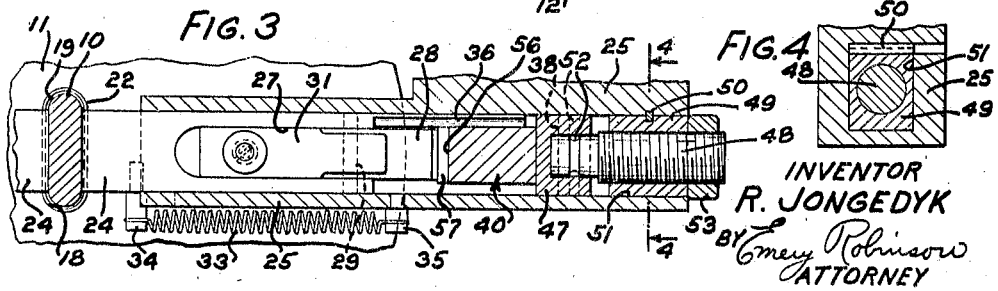

2,338,854

UNITED STATES PATENT OFFICE 2,338,854

EXTRUDING APPARATUS

Ralph Jongedyk, Hinsdale, Ill., assignor to Western Electric Company, Incorporated, New York, N. Y., a corporation of New York Application May 31, 1941, Serial No. 396,050

10 Claims. (Cl. 207—1)

This invention relates to extruding apparatus, and more particularly to improvements in extruding apparatus of the type employed for producing hollow articles, such as seamless containers, by a so-called backward extrusion process.

In the manufacture of seamless containers by this process, a portion of a metal slug is squeezed or extruded through a space between a vertically reciprocable punch and a cooperating die cavity and is caused to flow upwardly along the shank of the punch to form the wall of the container, while the portion of the metal slug remaining between the bottom of the punch and the bottom of the die forms the bottom of the container.

This extrusion process of manufacturing seamless containers is employed quite extensively in the manufacture of seamless metal containers or tubes, such as tooth paste tubes and the like. For extruding long and relatively narrow tubes, the extruding punch is necessarily long and of relatively small cross sectional area. In such instances, some difficulties have been encountered heretofore due to the tendency of the extruding punch to deflect or bend when subjected to the high pressures required for the extrusion process, particularly when extruding the relatively harder metals, such as aluminum or aluminum alloys. This objectionable bending or deflection of the punch usually occurs at the beginning of the extruding operation, being due, in some instances, to irregularities in the metal slugs.

An object of the present invention is to avoid the difficulties above referred to by providing guiding means adapted to prevent bending or deflection of the punch during the initial portion of the extruding operation.

In accordance with the above object, the extruding punch of an extruding apparatus of the type referred to is guided by a pair of guide bars, which are moved into sliding engagement with opposite sides of the shank of the punch prior to each extruding operation to prevent deflection or bending of the punch during the initial portion of each extruding operation, after which the guide bars are automatically retracted to permit the free passage of the extruded wall of the container upwardly along the shank of the punch.

A complete understanding of the invention may be had from the following detailed description when read in conjunction with the accompanying drawing, in which Fig. 1 is a fragmentary elevational view, partly in section, of an extruding apparatus embodying the invention;

Fig. 2 is a fragmentary view similar to Fig. 1 with the punch guiding slide bars shown in punch guiding positions;

Fig. 3 is an enlarged fragmentary plan section taken on line 3—3 of Fig. 2;

Fig. 4 is a detail section taken on line 4—4 of Fig. 3, and

Fig. 5 is a fragmentary view similar to Fig. 2, but with the punch guiding slide bars shown in their retracted positions.

The invention is illustrated in the drawing as embodied in an extruding press comprising a vertically reciprocable extruding punch or plunger 10 and a cooperating die 11, the latter being fixed to a stationary die supporting platen 12, a portion of which is shown in Figs. 1 and 2. The extruding punch is attached to a punch holder 15, which is fixed to a vertically reciprocable platen or ram 16 of the press.

The die has a die cavity 18 adapted to receive the slightly enlarged end portion 19 of the punch, which is of somewhat smaller cross section than the die cavity. The construction is such that when a metal slug (Fig. 2) placed in the die cavity is compressed by the punch, a portion of the slug is extruded or squeezed upwardly through the space between the punch and the wall of the die cavity. The extruded portion of the metal slug flows upwardly along the shank of the punch, as illustrated at 22 in Fig. 2, to form the wall of the extruded container while the portion of the slug remaining between the end of the punch and the bottom of the die cavity forms the bottom of the container. This process of extruding tubular containers from metal slugs is well known in the art. Therefore, no further description thereof is necessary to a complete understanding of the present invention, which pertains, primarily, to the provision of means for guiding the extruding punch during the initial portion of the extruding operation so as to prevent it from bending or deflecting under the force of the extruding pressure.

In the illustrated embodiment of the invention, the punch guiding means comprises a pair of horizontally slidable guide bars 24—24 arranged in opposed relationship on opposite sides of the punch. These guide bars are slidably mounted in fixed supporting blocks 25—25 so that they are endwise movable toward and away from the axis of the punch. The supporting blocks 25 are rigidly attached to the stationary die supporting platen.

Since the construction and operation of the two guide bars 24 are identical, a detailed description of only one of them will be given, and it will be obvious that this detailed description applies equally well to the other guide bar. That end of the guide bar which is farthest removed from the punch will be referred to hereinafter as the rear end of the guide bar, while the end adjacent the punch will be referred to as the punch engaging end of the guide bar.

The rear end portion of each guide bar is slotted, as indicated at 27, to accommodate a pivoted arm 28, which is pivotally connected to the guide bar by a horizontal pin 29. A leaf spring 31 serves to normally hold the pivoted arm in a horizontal position against the bottom of slot 27, as shown in Figs. 1 and 2. The pivoted arm is, however, capable of counter-clockwise movement against the opposing force of the leaf spring, as and for the purpose hereinafter described.

Each of the guide bars 24 is normally held in its retracted position, as shown in Fig. 1, by a coil spring 33 having one end attached to the guide bar at 34 and its opposite end attached to the supporting block at 35. An integral extension 36 on the rear end of each guide bar is adapted to engage a transverse surface 38 of the supporting block to limit the movement of the guide bar away from the punch.

Mechanism is provided for automatically moving the guide bars into sliding engagement with the shank of the punch just prior to each extrusion operation. This mechanism comprises two vertical cam bars 40—40, one for each guide bar. These cam bars are pivotally suspended from the punch holder 15 so that they are movable therewith. Each cam bar is pivoted near its upper end on a horizontal pin 41 fixed to the punch holder. Above each of the cam bars, a spring pressed ball 43 is mounted in the punch holder and is adapted to yieldably engage a V-notch 44 in the upper end of the associated cam bar to hold it in a substantially vertical position, as shown in Fig. 1. Each cam bar is formed at its lower end with a wedge-like cam portion 45 adapted, when the punch is lowered, to slidably engage the rear end surface of the pivoted arm 28 on the associated guide bar 24 and thus shift the latter toward the punch and into contact therewith, as shown in Fig. 2. Each cam bar comprises a straight portion 46, above cam portion 45, which serves to hold the associated guide bar in sliding contact with the shank of the punch during the initial portion of the extruding operation.

An adjustable thrust bearing 47 is arranged for sliding engagement with the back side of the cam bar to maintain the latter in the required angular position for shifting the guide bar to its effective guiding position. The thrust bearing 47 is of rectangular cross section and is horizontally slidable, but not rotatable, in the supporting block 25. An adjusting screw 48 is threaded in a bushing 49, which is secured, by means of a shear pin 50, in a rectangular bore 51 in the supporting block. The adjusting screw is connected, by means of a pin and groove 52, to the thrust bearing 47 so that the latter may be shifted by simply turning the screw. A nut 53 is provided for securing the thrust bearing in the adjusted position.

In the operation of the apparatus, a metal slug is placed in the die cavity 18 while the punch is in its uppermost position, after which the punch is moved downwardly by the press mechanism into compressing engagement with the metal slug, thus causing the slug to be extruded into a seamless container in a manner well known in the art. The cam bars 40 are moved downwardly with the punch and shift the punch guiding bars 24 into sliding engagement with opposite sides of the shank of the punch, as shown in Fig. 2. This occurs just prior to the beginning of the extruding operation so that the guide bars prevent deflection or bending of the punch at the beginning of the extruding operation. During the initial portion of the extruding operation, the guide bars are maintained in their punch guiding positions by the downwardly moving cam bars until the straight portions 46 thereof move past the pivoted arms 28 of the guide bars, whereupon the guide bars are automatically spring returned to their retracted positions. The reduced shank portions 56 of the cam bars permit the guide bars to return to their retracted positions under the force of the springs 33. The parts are designed and proportioned so that the retraction of the guide bars occurs just before the rising extruded container wall reaches the level of the guide bars, so that the latter do not interfere with the further rise of the extruded wall along the shank of the punch.

After the completion of the extruding operation, the punch is retracted from the die. The extruded container clings to the punch, from which it is removed in any suitable manner, preferably during the upward movement of the punch. As the cam bars move upwardly with the punch, the shoulders 57 at the upper ends of the straight portions 46 of the cam bars engage the underside of the pivoted arms 28 of the guide bars and swing them upwardly, as shown in Fig. 5, to permit the passage of the larger lower ends of the cam bars, after which the pivoted arms are returned to their normal horizontal positions by the flat springs 31.

From the above description, it will be apparent that the punch is guided by the bars 24 at the beginning and during the initial portion of the extruding cycle. This avoids deflection or bending of the punch under the force of the extruding pressure when first applied to the metal slugs, and thus makes possible the production of extruded tubes or containers having more uniform wall thickness than heretofore attainable.

It should be understood that the invention is not limited to the particular embodiments thereof herein illustrated and described, but is capable of other applications within the scope of the appended claims.

What is claimed is:

1. In an extruding apparatus having an extruding die and a cooperating reciprocatory extruding punch, movable means for laterally supporting said punch, means for yieldably holding said supporting means away from said punch, and means for moving said supporting means toward said punch and for unyieldingly holding said supporting means in sliding engagement with said punch during a portion of each extruding cycle.

2. In an extruding apparatus having an extruding die and a cooperating reciprocatory extruding punch, a movable member for laterally supporting said punch, means for yieldably holding said member away from said punch, actuating means movable with said punch for moving said punch supporting member into sliding engagement with the punch, and means cooperating with said actuating means for unyieldingly holding said punch supporting member in sliding engagement with the punch.

3. In an extruding apparatus having an extruding die and a cooperating reciprocatory extruding punch, a slidable guide bar movable into sliding engagement with the punch for guiding it during an initial portion of the extruding operation, means for unyieldingly holding the guide bar in said punch guiding position, and means for retracting said guide bar upon the completion of said initial portion of the extruding operation.

4. In an extruding apparatus having an extruding die and a cooperating reciprocatory extruding punch, a plurality of guide bars movable toward and away from said punch, means for yieldably holding said guide bars away from said punch, and means movable with the punch for moving said guide bars into sliding engagement with said punch during the initial portion of each extruding operation.

5. In an extruding apparatus having an extruding die and a cooperating reciprocatory extruding punch, a plurality of guide bars movable toward and away from said punch, means for moving said guide bars into sliding engagement with said punch during the initial portion of each extruding operation, and means under the control of said punch for retracting said guide bars upon the completion of said initial portion of each extruding operation.

6. In an extruding apparatus having an extruding die and a cooperating reciprocatory extruding punch, a pair of guide bars movable into sliding engagement with opposite sides of the punch for guiding it during the initial portion of each extruding operation, means for yieldably holding said guide bars away from said punch and means movable with the punch for moving said guide bars to their punch guiding positions.

7. In an extruding apparatus having an extruding die and a cooperating reciprocatory extruding punch, a pair of guide bars movable into sliding engagement with opposite sides of the punch for guiding it during the initial portion of each extruding operation, cam means movable with the punch for moving said guide bars to their punch guiding positions, and spring means for normally holding said guide bars in retracted positions.

8. In an extruding apparatus having an extruding die and a relatively movable extruding punch, a movable member for laterally supporting the punch, yieldable means for holding said member away from said punch and means rendered effective automatically at the beginning of each extruding cycle for moving said punch supporting member toward said punch and for unyieldingly holding said member in sliding engagement with said punch.

9. In an extruding apparatus having an extruding die and a cooperating reciprocatory extruding punch, a transversely slidable member for laterally supporting said punch, a cam engaging arm pivoted to the outer end of said member, and a cam bar mounted for movement with the punch for cooperating with said pivoted arm to move the punch supporting member into sliding engagement with the punch, said cam bar having a reduced shank portion for permitting the withdrawal of said punch supporting member at the completion of a predetermined initial portion of each extruding cycle, and said pivoted arm being mounted for movement in a direction for permitting the withdrawal of said cam bar upon retraction of said punch.

10. In an extruding apparatus having an extruding die and a cooperating reciprocatory extruding punch, a retractable member movable transversely of the punch for laterally supporting said punch, yieldable means for holding said member in its retracted position, and a cam movable with the punch, said cam having a portion for moving said punch supporting member toward said punch and a portion for holding said member in sliding engagement with the punch.

RALPH JONGEDYK.